United States Patent [19]
Yamanishi et al.

[11] Patent Number: 5,841,853
[45] Date of Patent: Nov. 24, 1998

[54] TELEPHONE APPARATUS WITH INTERRUPT CALL PROCESSING CAPABILITY

[75] Inventors: Koji Yamanishi, Fukuoka; Takako Ito, Dazaifu; Kouichi Kamimoto, Fukuoka, all of Japan

[73] Assignee: Matsushita Electric Industrial Co., Ltd., Osaka, Japan

[21] Appl. No.: 698,691

[22] Filed: Aug. 16, 1996

[30] Foreign Application Priority Data

Sep. 7, 1995 [JP] Japan ................................. 7-229833

[51] Int. Cl.⁶ .............................. H04M 1/00; H04M 3/42
[52] U.S. Cl. ...................... 379/215; 379/93.35; 379/142; 379/351; 379/421
[58] Field of Search ...................................... 379/215, 142, 379/201, 210, 211, 212, 93.35, 202, 203, 204, 205, 209, 419, 421, 350, 351; 348/15; 370/260

[56] References Cited

U.S. PATENT DOCUMENTS

| | | | |
|---|---|---|---|
| 4,947,421 | 8/1990 | Toy et al. ................................. | 379/215 |
| 5,263,084 | 11/1993 | Chaput et al. ........................... | 379/215 |
| 5,287,401 | 2/1994 | Lin ......................................... | 379/93.35 |
| 5,513,251 | 4/1996 | Rochkind et al. ..................... | 379/93.35 |
| 5,515,426 | 5/1996 | Yacenda et al. ........................ | 379/142 |
| 5,604,796 | 2/1997 | Yamazaki ................................ | 379/215 |
| 5,649,002 | 7/1997 | Brady et al. ............................. | 379/215 |

FOREIGN PATENT DOCUMENTS 5-244235A 9/1993 Japan.
5-327863A 12/1993 Japan.

*Primary Examiner*—Ahmad F. Matar
*Assistant Examiner*—Scott Wolinsky
*Attorney, Agent, or Firm*—Spencer & Frank

[57] ABSTRACT

A telephone apparatus can receive information about a third party sent from a telephone exchange with a call waiting service when a call is issued from the third party during a conversation using the telephone apparatus. Upon issuance of the call from the third party during the conversation over the telephone apparatus, the exchange sends out an alert signal, in response to which the telephone apparatus sends back an acknowledge signal. The telephone apparatus also mutes a speech transmitter circuit in order to protect calling party information such as a telephone number sent from the exchange in succession from being destroyed by a speech signal. The calling party information sent from the exchange can be received without fail and can subsequently be displayed.

20 Claims, 8 Drawing Sheets

| SYNCHRO-NIZING SIGNAL | CARRIER SIGNAL | NAME OF CALLING PARTY | TELEPHONE NUMBER OF CALLING PARTY | DATE | CHECKSUM |
|---|---|---|---|---|---|
| | | JAMES | 0123456789 | JAN.1 12:00 | |

| RESPONSE | CALLING PARTY INFORMATION | |
|---|---|---|
| ○ | A B C | 1 2 3 4 5 |
| | X Y Z | 0 9 8 7 6 |

14, 15, 16

TELEPHONE APPARATUS WITH INTERRUPT CALL PROCESSING CAPABILITY

BACKGROUND OF THE INVENTION

The present invention relates to a telephone apparatus which is capable of informing a person talking with a counterpart over the telephone of a call issued from a third party during the telephone conversation.

It is known that a service can be presented by a telephone exchange station such that, when a call is issued from a third party to a subscriber who is partaking in conversation with a current party over the telephone, information about the occurrence of such call is sent to the subscriber. This permits the subscriber to exchange the current party for the third party in accordance with a command issued by the subscriber. Such service is generally known as the call waiting service.

FIG. 10 is a schematic diagram for illustrating such call waiting service. Referring to the figure, let's assume that during telephone conversation between subscribers A and B, another subscriber C (third party) issues a call to the subscriber A. In that case, a telephone exchange station 40 sends an audible signal informing the subscriber A of the issuance or occurrence of the call from a third party in the form of an audible signal, to thereby allow the subscriber A to send back a signal commanding a counterpart change-over request to the telephone exchange station 40 when the subscriber A wants to make conversation with the subscriber C. In response to the command signal mentioned above, the telephone exchange 40 establishes or makes a telephone line between the subscriber A and the subscriber C while forcing the subscriber B to wait in the standby state.

However, in the conventional telephone apparatus known heretofore, the call from the third party is messaged to the called party only through a signaling tone. In this conjunction, it is to be noted that with such signaling tone, the called party can not know who has issued the call during the conversation before the telephone line is changed over by the telephone exchange station. More concretely, in the case of the example mentioned above, the subscriber A can identify the subscriber C only after the telephone line has been closed between them by the telephone exchange station. Besides, the exchange of the subscribers takes a time required for executing the relevant procedure. On the other hand, in the case where the telephone line is not changed over, there are available no measures which enable or allow the called subscriber to select with priority either the current calling party (hereinafter referred to as the prior calling party) or the posterior calling party in the course of telephone conversation, giving rise to a problem.

Of course, in the call waiting service mentioned above, such system is conceivable that when a call is issued from a third party to one of participants in a telephone conversation, the telephone exchange station sends information of the third party such as telephone number, name and the like to the participant to which the call from the third party is destined. With such an arrangement of the call waiting service system, the called party can certainly identify the third party before changing over the speech path to the latter.

However, an attempt for implementing such a call waiting service system will encounter another difficulty. More specifically, when the information of the third party is to be sent to the subscriber's apparatus of concern from the telephone exchange station, transmission of such information is performed by making use of an audible frequency band (voice band) in case the telephone exchange station and the subscriber's apparatus are interconnected by an analogue telephone line. In that case, an undesirable situation may arise such that the information data sent from the telephone exchange station will be destroyed by a speech signal of the called party.

SUMMARY OF THE INVENTION

In the light of the state of the art described above, At is an object of the present invention to provide a telephone apparatus which is capable of receiving stably and reliably information of a calling party (third party) sent from a telephone exchange station in the call waiting service and which allows a called party to recognize visually the name and/or telephone number of the calling party, to thereby solve or mitigate the problem or difficulty from which the conventional telephone apparatuses suffer.

In view of the above and other objects which will become apparent as the description proceeds, there is provided according to a general aspect of the present invention a telephone apparatus which is comprised of an alert signal detecting unit for detecting an alert signal sent from a telephone exchange station upon issuance of a call from a third party during conversation of a subscriber of above-mentioned telephone apparatus, a calling party information detecting unit for detecting calling party information incoming via a telephone line, and a muting control unit for applying a muting signal to a speech transmitter circuit upon reception of the calling party information issued by the telephone exchange station in succession to the alert signal.

With the arrangement of the telephone apparatus described above, it is possible to detect the calling party information sent to the telephone apparatus in the call waiting service while protecting the calling party information from being disturbed or destroyed by the speech signal of the called party.

In a preferred mode for carrying out the invention, the calling party information as detected may be displayed on a display device so that the subscriber called during the telephone conversation can visually recognize name and/or telephone number of the posterior calling party.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Now, the present invention will be described in detail in conjunction with what is presently considered as preferred or typical embodiments thereof by reference to the drawings.

Embodiment 1

Figure 1:
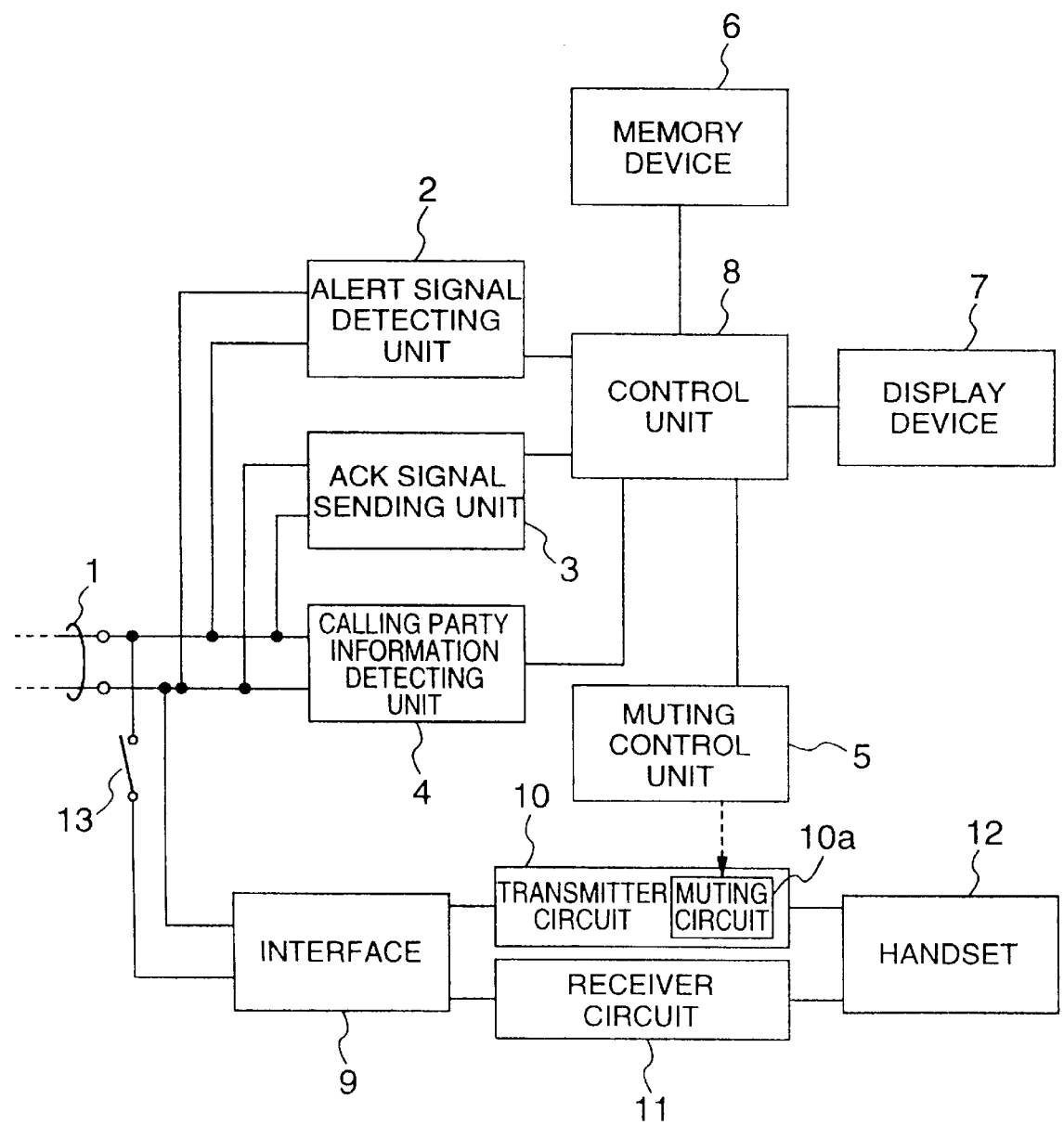
FIG. 1 is a block diagram showing in general a configuration of a telephone apparatus according to a first embodiment of the present invention.

FIG. 1 is a block diagram showing in general a configuration of a telephone apparatus according to a first embodiment of the present invention. In this figure, reference numeral 1 denotes a telephone line, numeral 2 denotes an alert signal detecting unit for detecting an alert signal inputted via the telephone line 1, numeral 3 denotes an ACK (acknowledge) signal sending unit for sending onto the telephone line 1 an ACK signal (acknowledge signal) indicating detection of the alert signal, and numeral 4 denotes a calling party information detecting unit for detecting calling party information incoming via the telephone line 1.

Further, reference numeral 5 denotes a muting control unit for muting or silencing a speech transmitter circuit 10 (i.e., suppressing or inhibiting operation of the speech transmitter circuit 10) which will be described hereinafter in detail. Numeral 6 denotes a memory device for storing the calling party information detected by the calling party information detecting unit 4 and response information indicating whether or not a called party (i.e., the participant subscriber called during a conversation over the telephone) has made a response, and numeral 7 denotes a display device for displaying the calling party information and the response information stored in the memory device 6 separately or distinctively from each other. Additionally, reference numeral 8 denotes a control unit implemented by using a microcomputer, numeral 9 denotes an interface for the telephone line 1, numeral 10 denotes a transmitter circuit for sending out a speech signal, numeral 11 denotes a receiver circuit for receiving a speech signal, and numeral 12 denotes a handset equipped with both a microphone and a loud speaker. Finally, reference numeral 13 denotes a hookswitch for opening/ closing the telephone line 1.

Figure 2:
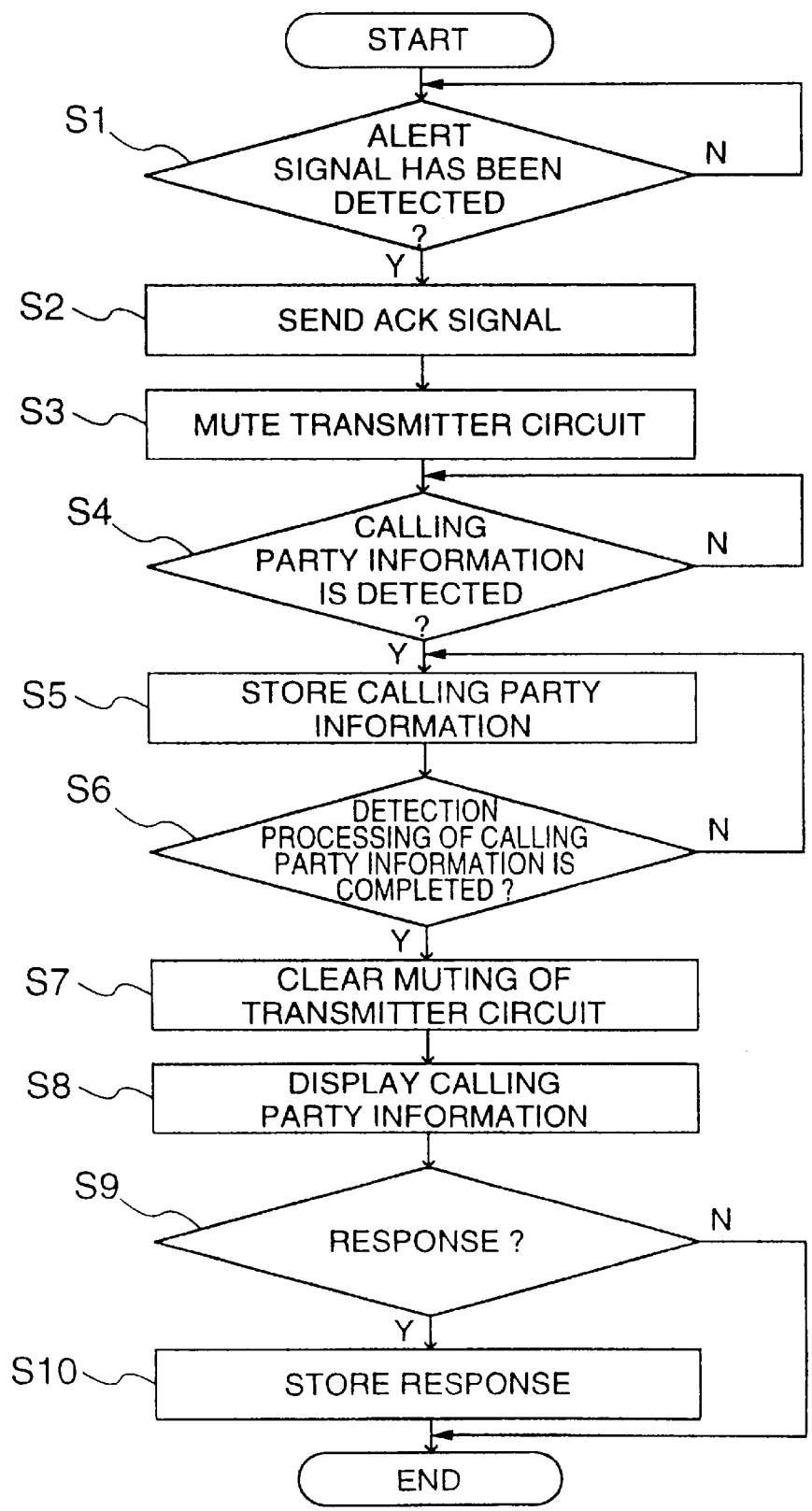
FIG. 2 is a flow chart for illustrating operation of the telephone apparatus according to the first embodiment of the invention.

Next, the operation of the telephone apparatus implemented as described above and shown in FIG. 1 will be elucidated by reference to a flow chart of FIG. 2. In the call waiting service, a telephone exchange station sends out an alert signal indicating a call issued by a third party. The alert signal is then inputted to a destination telephone apparatus to which the call is to be directed via the telephone line 1. Preferably, the alert signal should be composed of dual tone signals of 2130 Hz and 2750 Hz, respectively, and have a temporal duration or width of 80±5 msec. When both the tone signals of 2130 Hz and 2750 Hz are detected concurrently by the alert signal detecting unit 2, the latter outputs a detection signal which is then supplied to the control unit 8. In response, the control unit 8 identifies the output signal of the alert signal detecting unit 2 as the alert signal when the duration thereof falls within a temporal range of 80±5 msec., whereupon the control unit 8 sends a corresponding message signal to the ACK signal sending unit 3 (step SI in FIG. 2).

Upon reception of the above message, the ACK signal sending unit 3 automatically sends out an ACK signal indicating detection of the alert signal onto the telephone line 1 (step S2). Preferably, the ACK signal should be composed of signal components of 1633 Hz and 941 Hz, respectively, and have a temporal duration or width of 60±5 msec. The ACK signal is sent to the telephone exchange station by way of the telephone line 1.

Subsequently, under command of the control unit 8, the muting control unit 5 applies a muting signal to the speech transmitter circuit 10 upon lapse of a predetermined time after the sending-out of the ACK signal onto the telephone line 1 (step S3). More specifically, in response to the signal inputted from the muting control unit 5, a muting circuit 10a incorporated in the speech transmitter circuit 10 is activated to thereby reduce the gain of the transmission amplifier or set the amplifier to the non-operating state.

On the other hand, the telephone exchange station responds to the ACK signal by sending out information of the calling party (third party) who issued the call mentioned previously to the telephone apparatus now under consideration. The information may include the name of the calling party, telephone number thereof and/or the like.

Thereafter, the control unit 8 makes a decision about whether the calling party information received via the telephone line 1 has been detected by the calling party information detecting unit 4 (step S4).

Figures 3, 4, 10:
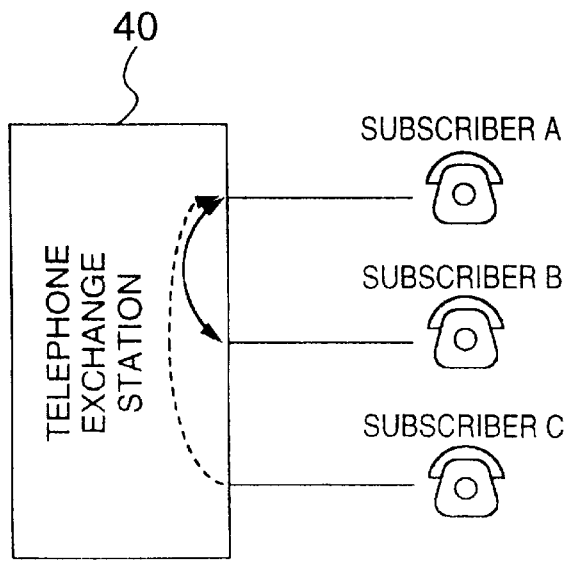
FIG. 3 is a view for illustrating, by way of example only, a data structure or format of calling party information which may be adopted in a telephone system according to the first embodiment of the invention.
FIG. 4 is a view for illustrating a state where calling party information and response information are displayed on a display device in the telephone apparatus according to the first embodiment of the invention.
FIG. 10 is a schematic diagram for illustrating a call waiting service.

FIG. 3 is a view for illustrating, by way of example only, a data structure or format of the calling arty information, which will be self-explanatory from the drawing. If it is decided in the step S4 that the calling party information was not detected, the calling party information detecting unit 4 is set to the standby state until the calling party information is detected. On the other hand, if the calling party information was detected in the step S4, the control unit 8 stores the calling party information in the memory device 6 in a step S5.

Next, the control unit 8 makes a decision as to whether or not detection of the calling party information by the calling party information detecting unit 4 has been completed in a step S6. If it is decided in the step S6 that the processing for detection of the calling party information has not been completed yet, the calling party information is stored continuously in the memory device 6 (steps S5 and S6). By contrast, if it is decided in the step S6 that the calling party information detection processing has been completed, the control unit 8 removes or clears the muting control effected for the speech transmitter circuit 10 by the muting control unit 5 in a step S7, which is then followed by a step S8 where the calling party information of a format such as shown in FIG. 3 is displayed on the display device 7.

In this manner, the timing (or time point) at which the muting control is performed by the muting control unit 5 can be made to match or conform with the timing at which the exchange of the telephone exchange station sends out the calling party information in response to the ACK signal. In this manner, because the speech signal originating in the telephone apparatus now under consideration is suppressed when the telephone exchange station sends out the calling party information, the calling party information can be positively protected against destruction or disturbance due to the speech signal or the like upon reception of the calling party information.

In a next step S9, the control unit 8 checks whether the called party has responded to the calling party. When the hooking operation for opening the telephone line 1 is performed for a predetermined time by means of the hookswitch 13 to indicate a response of the called party to the call of the calling party, the control unit 8 stores response information indicative of the response to the calling party in the memory device 6 in a step S10.

FIG. 4 is a view for illustrating history information of the calling party and the called party (i.e., the calling party information and the response information) received and stored in the memory device 6 up to a given time point in the state being displayed on the display device 7. In FIG. 4, reference numeral 14 designates response information indicating whether or not response has been made to the call of the calling party, numeral 15 designates the names of the calling parties, and numeral 16 designates the telephone numbers of the calling parties. In the case of the example illustrated in FIG. 4, it is assumed that the called party has responded to the call of the calling party named "ABC" and allocated with telephone number "12345", as indicated by a circle mark.

In the foregoing description of the first embodiment of the present invention, it has been assumed that the control unit 8 is constituted by a micro-computer. It goes without saying that the units 2 to 5 may equally be implemented by resorting to microcomputer techniques. Furthermore, the calling party information sent out from the telephone exchange station may be composed only of the telephone number or a combination of the telephone number and the name of the calling party, which may differ in dependence on telephone companies to which the telephone apparatus under consideration is subscribed. It should however be mentioned that when the telephone apparatus is equipped with an electric telephone book or directory containing information about the names of persons and/or companies in correspondence to telephone numbers, it is possible to retrieve and display the names of the calling parties by referring to the electronic telephone directory even if the calling party information sent from the telephone exchange station is only of the telephone number of the calling party.

As will now be understood from the foregoing description of the first embodiment of the present invention, the calling party information can be acquired positively without fail by protecting the calling party information received by the calling party information detecting unit 4 from being destroyed, altered or disturbed by the speech signal sent out onto the telephone line 1.

Embodiment 2

Figure 6:
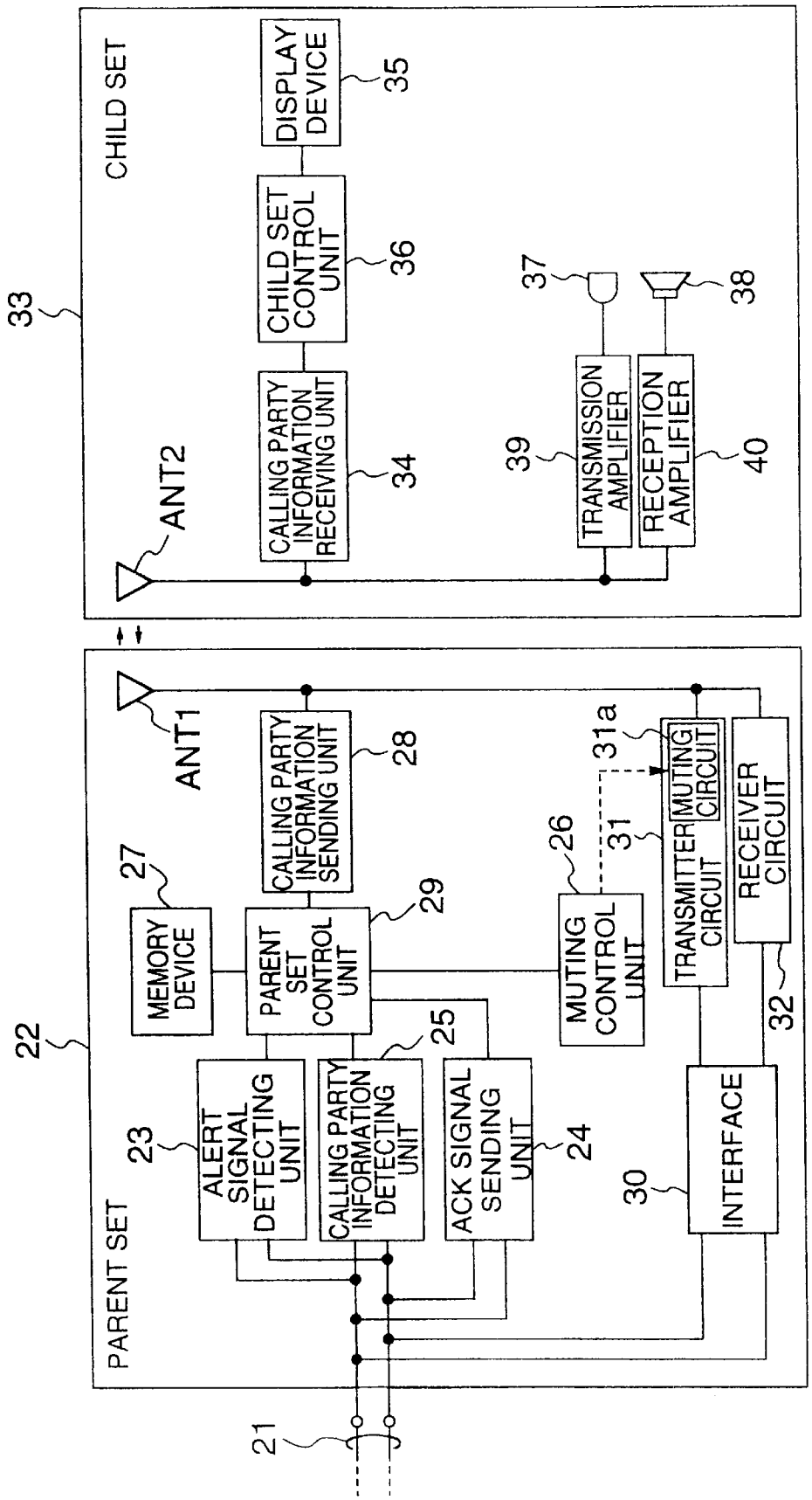
FIG. 6 is a block diagram showing in general a configuration of a telephone apparatus according to the second embodiment of the present invention.

Now, a description will be directed to a second embodiment of the invention. FIG. 6 is a block diagram showing in general a configuration of a telephone apparatus according to the second embodiment of the present invention, wherein the telephone apparatus now of concern is assumed as being composed of a parent set and at least a child set. Referring to FIG. 6, reference numeral 21 denotes a telephone line, numeral 22 denotes generally a parent set of the telephone apparatus connected to the telephone line 21 and a numeral 33 denotes generally a child set of the telephone apparatus.

Furthermore, in conjunction with the parent set 22, reference numeral 23 denotes an alert signal detecting unit for detecting an alert signal inputted via the telephone line 21, and numeral 24 denotes an ACK signal sending unit for sending out an ACK signal (acknowledge signal) onto the telephone line 21 so as to indicate detection of the alert signal. Further, reference numeral 25 denotes a calling party information detecting unit for detecting calling party information incoming via the telephone line 21, numeral 26 denotes a muting control unit for muting or silencing a speech transmitter circuit 31, numeral 27 denotes a memory device for storing the calling party information detected by the calling party information detecting unit 25, numeral 28 denotes a calling party information sending unit for sending the calling party information stored in the memory device 27 as a calling party information signal to the child set 33 which will be described in detail hereinafter, and reference numeral 29 denotes a parent set control unit implemented by using a microcomputer. Additionally, reference numeral 30 denotes an interface for the telephone line 21, numeral 31 denotes a transmitter circuit for sending out a speech signal, numeral 32 denotes a receiver circuit for receiving the speech signal, and reference symbol ANT1 designates an antenna of the parent set for emitting the calling party information signal in the form of a radio wave signal.

Provided in association with the child set 33 which is capable of performing communication with the parent set are an antenna ANT2 for receiving the calling party information in the form of the calling party information radio wave signal received via the antenna ANT2, a display device 35 for displaying the calling party information as detected by the calling party information receiving unit 34, a child set control unit 36 implemented by a microcomputer, a microphone 37, a speaker 38, a transmission amplifier 39, and a reception amplifier 40, respectively.

With the arrangement of the telephone apparatus described above, it is contemplated to detect the calling party information by the calling party information detecting unit 25 of the parent set 22, store the calling party information as detected in the storage device 27 and display the calling party information on the display device 35 of the child set 33 in the call waiting service.

Figure 5:
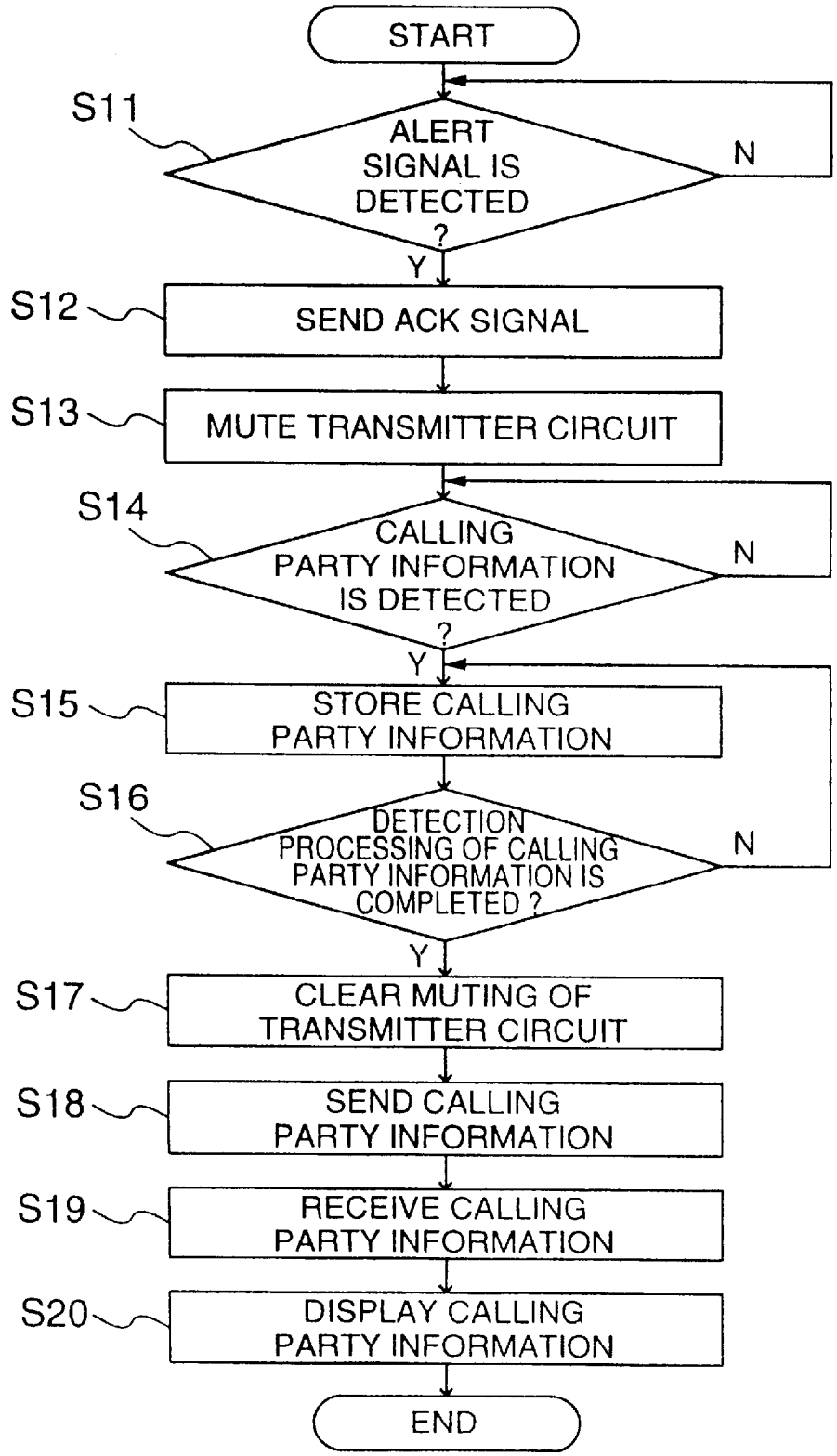
FIG. 5 is a flow chart for illustrating operation of the telephone apparatus according to a second embodiment of the present invention.

Next, operation of the telephone apparatus shown in FIG. 6 will be described in detail by reference to the flow chart of FIG. 5. When the alert signal (a signal having frequency components of 2130 Hz and 2750 Hz, respectively) indicating a call issued by a third party is inputted to the parent set 22 of the telephone apparatus now of concern via the telephone line 21 in the call waiting service, the alert signal detecting unit 23 detects the alert signal, whereon the detection output of the alert signal detecting unit 23 is supplied to the parent set control unit 29. In response, the parent set control unit 29 identifies the output signal of the alert signal detecting unit 23 as the alert signal when the duration thereof falls within a temporal range of 80±5 msec., whereupon the parent set control unit 29 sends a corresponding message signal to the ACK signal sending unit 24 (step S11 in FIG. 5). Upon reception of the above message, the ACK signal sending unit 24 automatically sends out an ACK signal indicating detection of the alert signal onto the telephone line 21 (step S12).

Subsequently, under command of the parent set control unit 29, the muting control unit 26 applies a muting signal to the speech transmitter circuit 31. More specifically, a muting circuit 31a incorporated in the transmitter circuit 31 is activated to thereby reduce the gain of the transmission amplifier (step S13).

Thereafter, the parent set control unit 29 makes a decision about whether the calling party information received via the telephone line 21 has been detected by the calling party information detecting unit 25 (step S14). If it is decided in the step S14 that the calling party information was not detected, the calling party information detecting unit 25 is set to the standby state until the calling party information is detected. On the other hand, if it is decided that the calling party information was detected in the step S14, the parent set control unit 29 stores the calling party 20 information in the memory device 27 in a step S15.

Next, the parent set control unit 29 makes a decision as to whether or not detection of the calling party information by the calling party information detecting unit 25 has been completed (step S16). If it is decided in the step S16 that the processing for detecting the calling party information has not been completed yet, storage of the calling party information in the memory device 27 is continued (steps S15 and S16). By contrast, if it is decided in the step S16 that the calling party information detection processing has been completed, the parent set control unit 29 removes or clears the muting control applied to the transmitter circuit 31 by the muting control unit 26 (step S17). By matching the timing for muting appropriately with the timing for the telephone exchange station to send out the calling party information, the latter can be protected against destruction or disturbance by the speech signal upon reception of the calling party information, as described hereinbefore in conjunction with the first exemplary embodiment of the invention.

Now, the parent set control unit 29 allows the calling party information sending unit 28 to send out the calling party information stored in the storage device 27 to the child set 33 via the antenna ANT1 of the parent set (step S18).

On the other hand, the calling party information receiving unit 34 of the child set 33 receives via the antenna ANT2 thereof the calling party information signal sent from the calling party information sending unit 28 via the antenna ANT1 of the parent set, to thereby detect the calling party information (step S19), whereupon the calling party information detected in the step S19 is displayed on the display device 35 by the child set control unit 36 (step S20).

Although it has only been described above that the child set control unit 36 has the function of displaying the calling party information on the display device 35, it should be appreciated that the child set control unit 36 may further be provided with the function of causing the response information to be stored in the memory device 27 under the control of the parent set control unit 29 upon detection of the response made by the child set 33.

Furthermore, in the telephone apparatus according to the second embodiment of the invention, it has been described that the parent set control unit 29 and the child set control unit 36 are implemented by microcomputers, respectively. In this connection, it should be appreciated that the units 23 to 26 may be implemented by using a microcomputer.

As will now be understood from the foregoing, in the telephone apparatus according to the instant embodiment of the invention, the incoming calling party information in the call waiting service is detected and not only stored in the memory device 27 but also sent to the child set 33 to be displayed on the display device 35 of the child set 33. Thus, a called party who is away from the parent set can visually recognize the calling party information displayed at the child set and thus can make a decision instantaneously whether a telephone conversation with a calling party indicated by the calling party information as displayed on the child set is to be validated or not. Furthermore, by virtue of the arrangement that the response information indicating whether or not a response was issued is sent from the child set control unit 36 to the parent set control unit 29, the calling party information and the response information can be displayed on the display device 35 separately or distinctively from each other. Thus, a calling party to whom no response was made can easily be recognized, which in turn means that the called party can readily decide whether he or she should call which of the calling parties that were recorded without making response.

Embodiment 3

Figure 7:
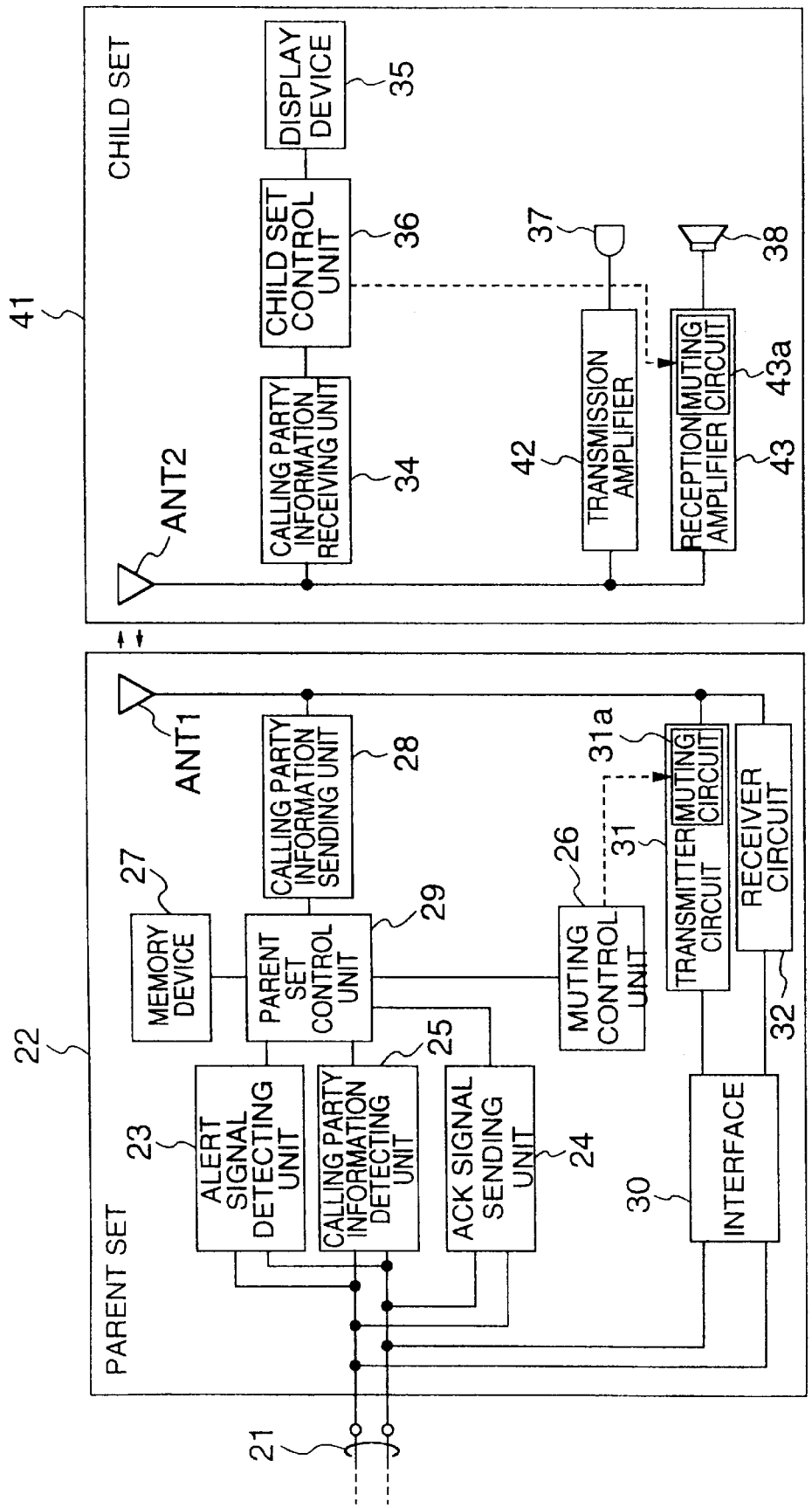
FIG. 7 is a block diagram showing in general a configuration of a telephone apparatus according to a third embodiment of the present invention.
Figure 8:
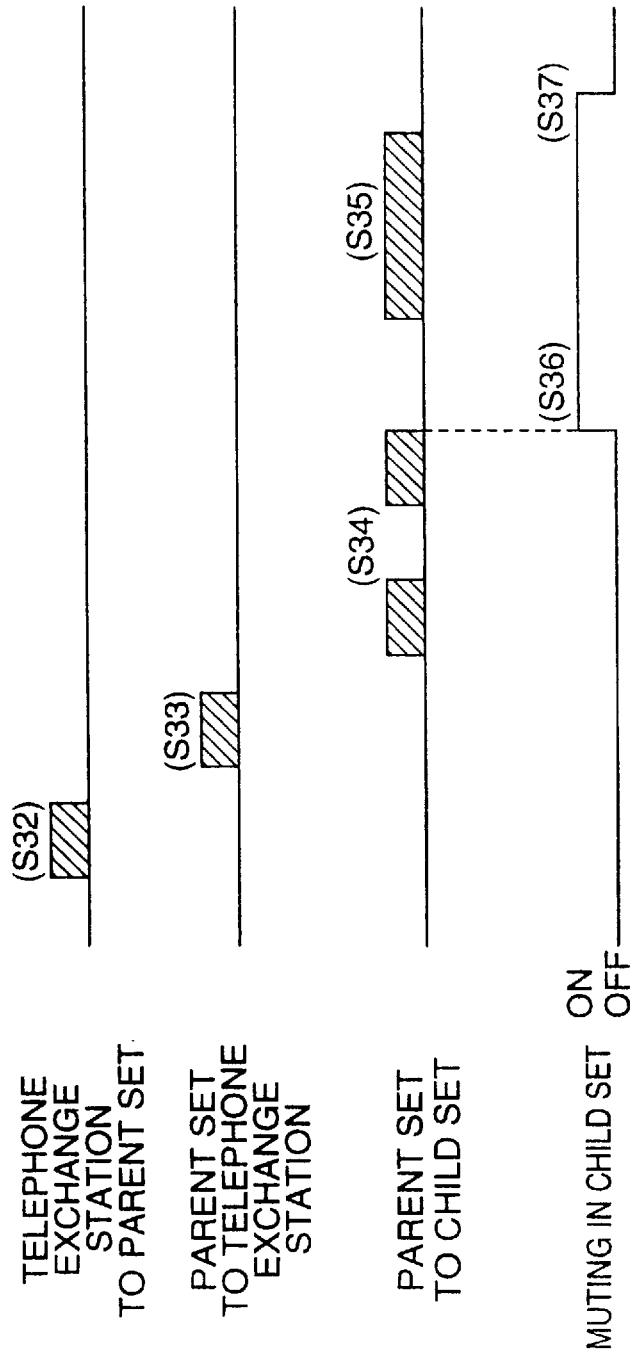
FIG. 8 is a timing chart for illustrating operation of the telephone apparatus according to the third embodiment of the invention.

Next, a description will be directed to a third embodiment of the present invention. FIG. 7 is a block diagram showing in general a configuration of a telephone apparatus according to the third embodiment. The parent set 22 is realized in an arrangement similar to the one described previously by reference to FIG. 6. Further, the child set 41 is provided with the antenna ANT2, the calling party information receiving unit 34 and the display device 35, as in the case of the telephone apparatus shown in FIG. 6. In FIG. 7, reference numeral 37 denotes a microphone, 38 denotes a speaker, 42 denotes transmission amplifier, 43 denotes a reception amplifier, and 43a denotes a muting circuit incorporated in the reception amplifier 43. FIG. 8 is a timing chart for illustrating the operation of the telephone apparatus according to the instant embodiment of the invention.

Operation of the telephone apparatus according to the third embodiment will now be described by reference to FIG. 8. A dual tone signal comprised of tone signals having frequencies of 2130 Hz and 2750 Hz, respectively, is inputted via the telephone line 21 to the parent set 22 as the alert signal indicating a call issued by a third party in the call waiting service as shown (step S32). When the alert signal detecting unit 23 detects the alert signal, the ACK signal is automatically sent out onto the telephone line 21 by the ACK signal sending unit 24 (step S33).

On the other hand, data of the calling party information such as the telephone number and the name of the third party are sent to the child set from the parent set by way of the antennas ANT1 and ANT2. However, because the child set is in the busy state at that time point, instantaneous transmission of the data mentioned above to the child set from the parent set would result in generation of no data tone but noise from the speaker 38 of the child set. For evading such an undesirable situation, the parent set is so arranged as to send at first a data signal of a single frequency (e.g. 300 Hz) twice each with a temporal duration of 100 msec. before sending out the data signal of the calling party information mentioned above (step S34). The first mentioned data signal can not bring about generation of noise. Upon reception of this data signal by the child set, the muting control is validated in preparation for the reception of the calling party information in the child set (step S36). More specifically, upon reception of the aforementioned single-frequency data signal from the parent set, the control unit 36 incorporated in the child set issues a muting command to the muting circuit 43a, as a result of which the mute state inhibiting the received speech signal from being outputted to the speaker 38 is validated.

Subsequently, the parent set sends data of the calling party information such as the telephone number and the name to the child set (step S35). In that case, however, because the child set is muted for the reception of the speech signal, the data signal is not generated audibly as noise, but the information such as the telephone number and the name as mentioned above is displayed on the display device 35. Thereafter, at the end of the data reception by the child set, the muting control is cleared, whereon the normal conversation enabling state is restored (step S37).

Owing to the arrangement of the telephone apparatus including the parent set and the child set described above, the data of the calling party information is positively prevented from leaking through to the loud speaker of the child set as noise when the call is to be displayed on the display device incorporated in the child set in the call waiting service.

Embodiment 4

Next, a telephone apparatus according to a fourth embodiment of the present invention will be described. In the case of the instant embodiment, a major portion of the telephone apparatus is implemented in the same configuration as that of the telephone apparatus shown in FIG. 1.

Figure 9:
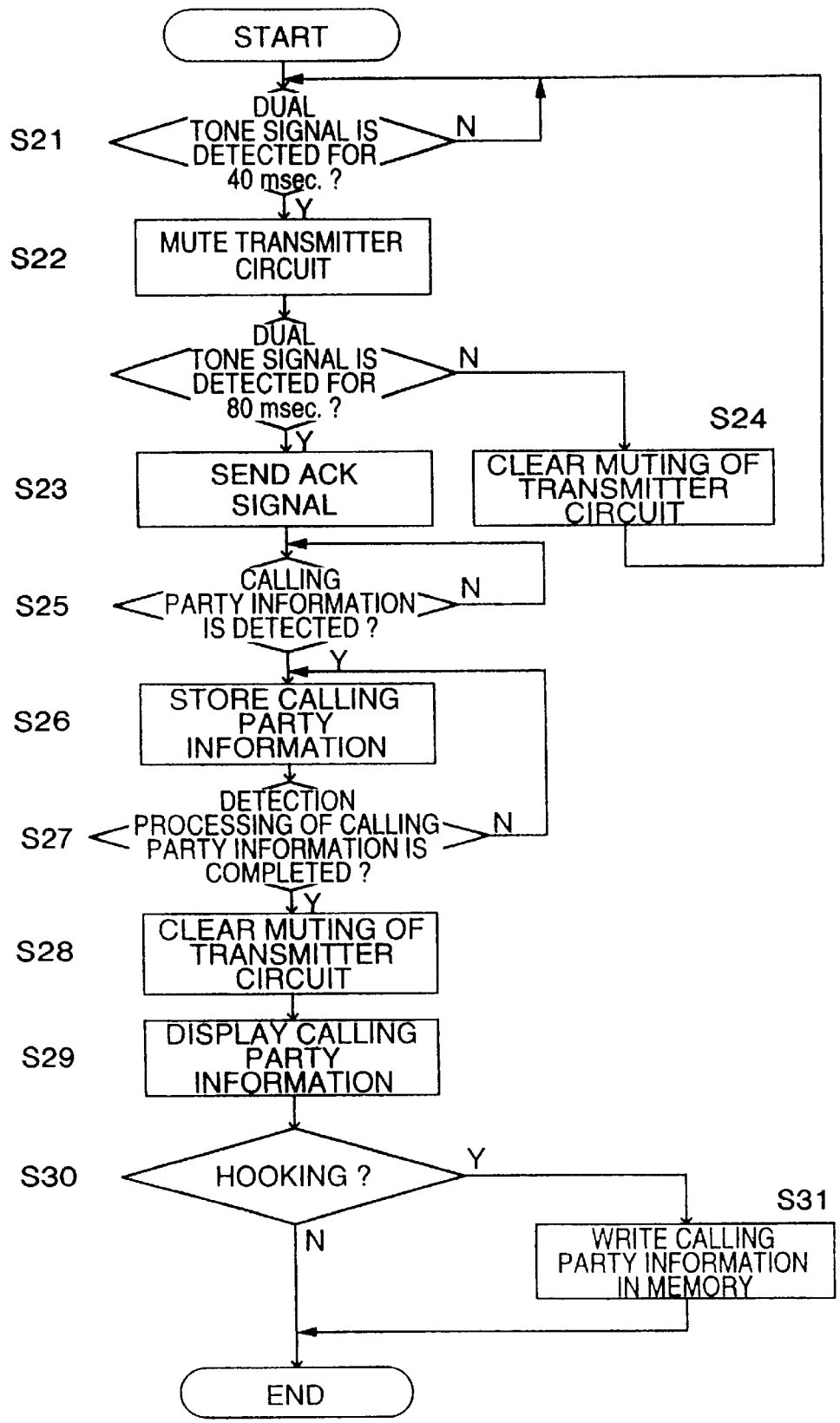
FIG. 9 is a flow chart for illustrating operation of the telephone apparatus according to a fourth embodiment of the invention.

Operation of the telephone apparatus according to the instant embodiment will now be described by reference to the flow chart of FIG. 9. A dual tone signal comprised of tone signals having frequencies of 2130 Hz and 2750 Hz, respectively, is inputted via the telephone line 1 to the parent set 22 as the alert signal indicating a call issued by a third party in the call waiting service, as shown in FIG. 9. When the alert signal detecting unit 2 simultaneously detects both the tone signals having frequencies of 2130 Hz and 2750 Hz, respectively, for 40 msec. (step S21), then the transmitter circuit 10 is instantaneously muted by means of the muting control unit 5 (step S22). At this junction, it should however be mentioned that at the time point when the detection signal is first outputted from the alert signal detecting unit 2, there is a possibility that the detected signal did not originate as a true or intrinsic alert signal but may have been generated by an erroneous operation due to the speech signal.

Such being the circumstance, the alert signal detecting operation is continued even after the transmitter circuit 10 has been muted, and when both the signals having the frequencies of 2130 Hz and 2750 Hz, respectively, have been detected concurrently in continuation for a predetermined time period (e.g. 80 ±5 msec.), then it is decided that the output of the alert signal detecting unit 2 represents an intrinsic or true alert signal, whereupon the ACK signal indicating the detection of the alert signal is automatically sent out onto the telephone line 1 by means of the ACK (acknowledge) signal sending unit 3 (step S23). To this end, the ACK signal may be composed of frequency components of 1633 Hz and 941 Hz, respectively, and a temporal duration falling within a range of 60±5 msec.

On the contrary, when both the signal components of 3130 Hz and 2750 Hz could not be continuously detected for the predetermined period (80±5 msec.), the transmitter circuit 10 is instantaneously released from the muted state under the control of the muting control unit 5 (step S24), whereby the muting control unit 5 is set to the standby state waiting for arrival of the alert signal (step S21). Thus, even if the detection output of the alert signal detecting unit 2 is generated due to a frequency component of the speech signal close to that of the alert signal, the detection output of the alert signal detecting unit 2 disappears after the transmitter circuit 10 has been muted. Thus, it can be determined that no alert signal was generated after a lapse of ten or so milliseconds.

In this manner, by muting instantaneously the transmitter circuit 10, it can be decided whether the signal detected by the alert signal detecting unit 2 is generated on the basis of an intrinsic alert signal or due to erroneous operation brought about erroneously by the speech signal to be sent out. Thus, with the arrangement described above, even in the case where a frequency component close to that of the speech signal for transmission is contained in the alert signal, the possibility of detecting erroneously the frequency component as the alert signal can be avoided. Besides, even when the transmitter circuit 10 is muted due to detection of the frequency component close to that of the alert signal, the transmitter circuit 10 is able to get rid of the muting control after a lapse of ten or so milliseconds. Thus, the muting of the transmitter circuit 10 will scarcely affect the telephone conversation.

As will now be apparent from the foregoing description, the transmitter circuit 10 can be muted in the manner described above depending on whether the signal detected by the alert signal detecting unit 2 is intrinsically an alert signal or a signal generated erroneously by the speech signal.

After sending out the ACK signal, the calling party information signal incoming via the telephone line 1 is detected by the calling party information detecting unit 4 (step S25), as can be seen in FIG. 9, to be subsequently stored in the memory device 6 (step S26). Unless the detection processing executed by the calling party information detecting unit 4 has been completed, a return is made to the step S26 where the calling party information is stored in succession (step S27). On the other hand, if the detection processing performed by the calling party information detecting unit 4 has been completed, the transmitter circuit 10 gets rid of the muting control applied by the muting control unit 5 to thereby allow the telephone conversation to be restarted (step S28), while allowing the calling party information to be displayed on the display device 7 (step S29).

Upon detection of the hooking, the telephone exchange station changes over from the current counterpart or party of the telephone conversation to the calling party (step S30), while the response information is written in the memory device 6 (step S31).

Owing to the arrangement described above, generation of the ACK signal onto the busy telephone line due to the erroneous detection of the speech signal for transmission as the alert signal in the call waiting service can positively be prevented. Besides, the telephone conversation interrupt time due to the muting operation can be shortened to a time duration on the order of ten milliseconds, which is very short and affects substantially no influence on the telephone conversation when compared with the one to two seconds required in the conventional telephone apparatus.

Many modifications and variations of the present invention are possible in the light of the above techniques. It is therefore to be understood that within the scope of the appended claims, the invention may be practiced otherwise than as specifically described.

What is claimed is:

1. A telephone apparatus including a parent set connected to a telephone line and a child set capable of wireless communication with said parent set, wherein said parent set comprises:

a transmitter circuit for sending a speech signal onto said telephone line, a receiver circuit for receiving a speech signal from said telephone line, alert signal detecting means for detecting an alert signal sent from a telephone exchange in response to a call from a third party during a telephone conversation through said telephone apparatus, and calling party information detecting means for detecting calling party information incoming from said telephone exchange via said telephone line after said alert signal;

wherein said child set comprises:

a microphone, a speaker, transmission and reception amplifier means for transmitting to and receiving from said parent set speech signals of said telephone conversation, and calling party information receiving means for receiving the calling party information, detected by and sent from said parent set; and wherein at least one of said parent and child sets further comprises muting control means for speech-signal muting of said telephone conversation upon receipt of said calling party information sent by said telephone exchange.

2. A telephone apparatus according to claim 1, wherein said parent set further comprises:

acknowledge signal sending means for sending out automatically an acknowledge signal onto said telephone line after detection of said alert signal, said acknowledge signal serving as a message for indicating the detection of said alert signal to said telephone exchange.

3. A telephone apparatus according to claim 1, wherein said child set further comprises child set control means for displaying the calling party information as detected on a display device.

4. A telephone apparatus according to claim 1, wherein said parent set further comprises:

a memory, parent set control means for storing in said memory said calling party information detected by said calling party information detecting means, and calling party information sending means for sending out to said child set said calling party information stored in said memory.

5. A telephone apparatus including a parent set connected to a telephone line and a child set capable of communication with said parent set, wherein said parent set comprises:

a transmitter circuit for sending a speech signal onto a telephone line, a receiver circuit for receiving a speech signal from said telephone line, alert signal detecting means for detecting an alert signal sent from a telephone exchange in response to issuance of a call from a third party during a telephone conversation through said telephone apparatus, calling party information detecting means for detecting calling party information incoming from said telephone exchange via said telephone line after said alert signal, muting control means for muting said transmitter circuit upon reception of said calling party information sent by said telephone exchange, a memory device, parent set control means for storing said calling party information detected by said calling party information detecting means in a memory device, and calling party information sending means for sending out said calling party information stored in said memory device as a calling party information signal;

wherein said child set comprises calling party information receiving means for receiving said calling party information signal from said parent set to thereby detect said calling party information; and wherein said parent set control means additionally receives response information indicating whether or not said child set has responded to the call of the third party.

6. A telephone apparatus including a parent set connected to a telephone line and a child set capable of communication with said parent set, wherein said parent set of said telephone apparatus comprises:

a transmitter circuit for sending a speech signal onto said telephone line, a receiver circuit for receiving a speech signal from said telephone line, alert signal detecting means for detecting an alert signal sent from a telephone exchange in response to issuance of a call from a third party during a telephone conversation through said telephone apparatus, calling party information detecting means for detecting calling party information incoming from said telephone exchange via said telephone line after said alert signal, muting control means for muting said transmitter circuit upon receipt of said calling party information sent by said telephone exchange, a memory device, parent set control means for storing said calling party information detected by said calling party information detecting means in said memory device, and calling party information sending means for sending mute command data to said child set and then sending said stored calling party information to said child set; and wherein said child set of said telephone apparatus comprises:

a receiver circuit, and calling party information receiving means for muting the receiver circuit upon detection of said mute command data sent from said parent set, and then detecting said calling party information sent from said parent set, and clearing the muting of said receiver circuit after detection of said calling party information.

7. In a telephone apparatus having a transmitter circuit, a method of processing reception of calling party information, comprising:

an alert signal detecting step of detecting an alert signal supplied from a telephone exchange upon issuance of a call from a third party during a telephone conversation through said telephone apparatus;

an acknowledge signal sending step of sending out automatically onto a telephone line an acknowledge signal for informing said telephone exchange of the detection of said alert signal after detection of said alert signal;

a calling party information detecting step of detecting calling party information incoming from said telephone exchange via said telephone line after said alert signal;

a mute control step of muting said transmitter circuit upon reception of the calling party information issued by said telephone exchange; and a control step of storing response information indicating whether or not a response has been made to the call from said third party together with said calling party information detected by said calling party information detecting step.

8. In a telephone apparatus including a parent set connected to a telephone line and a child set which includes a microphone and a speaker and which is capable of wireless communication with said parent set, a method of processing reception of calling party information, comprising:

an alert signal detecting step of detecting an alert signal supplied from a telephone exchange upon issuance of a call from a third party during a telephone conversation through said telephone apparatus, said alert signal detecting step being conducted by said parent set;

an acknowledge signal sending step of sending out automatically onto a telephone line an acknowledge signal for informing said telephone exchange of the detection of said alert signal after detection of said alert signal, said acknowledge signal sending step being conducted by said parent set;

a calling party information detecting step of detecting calling party information incoming from said telephone exchange via said telephone line after said alert signal, said calling party information detecting step being conducted by said parent set;

a parent set control step of storing the calling party information detected by said calling party information detecting step in a memory device of said parent set;

a calling party information sending step of sending said calling party information to said child set as a calling party information signal;

a calling party information receiving step of receiving said calling party information signal at said child set to thereby detect said calling party information; and a muting control step of speech signal muting of said telephone conversation upon receipt of said calling party information sent by said telephone exchange.

9. A telephone apparatus, comprising:

a transmitter circuit for sending a speech signal onto a telephone line;

a receiver circuit for receiving a speech signal from said telephone line;

signal detecting means for detecting a signal of a frequency component contained in an alert signal sent from a telephone exchange in response to issuance of a call from a third party during a telephone conversation through said telephone apparatus;

a muting circuit for inhibiting said transmitter circuit;

acknowledge signal sending means for sending onto said telephone line an acknowledge signal informing said telephone exchange of the detection of said alert signal;

calling party information detecting means for detecting calling party information incoming from said telephone exchange via said telephone line after said alert signal;

muting start control means for controlling said muting circuit to thereby inhibit said transmitter circuit at a time point when said signal detecting means detects said signal;

acknowledge signal sending control means for recognizing said signal detected by said signal detecting means as an alert signal when said signal is detected continuously for a predetermined time, to thereby cause said acknowledge signal sending means to send out said acknowledge signal; and muting clearing means for disabling operation of said muting circuit unless said signal detected by said signal detecting means is continuously detected for said predetermined time.

10. A telephone apparatus according to claim 9, wherein said calling party information detecting means detects the calling party information incoming via said acknowledge telephone line after said signal sending means has performed sending control.

11. A telephone apparatus according to claim 10, further comprising a display, and control means for displaying said information on said display when said calling party information detecting means has detected said information.

12. A telephone apparatus according to claim 10, further comprising a memory, and control means for storing said calling party information in said memory when said calling party information detecting means detects said calling party information.

13. A telephone apparatus according to claim 12, further comprising a display, and wherein said control means displays on said display the calling party information stored in said memory.

14. A telephone apparatus comprising:

a transmitter circuit for sending a speech signal onto said telephone line;

a receiver circuit for receiving a speech signal from said telephone line;

alert signal detecting means for detecting an alert signal sent from a telephone exchange in response to a call from a third party during a telephone conversation through said telephone apparatus;

calling party information detecting means for detecting calling party information incoming from said telephone exchange via said telephone line after said alert signal;

muting control means for muting said transmitter circuit upon receipt of the calling party information sent by said telephone exchange;

a display device;

a memory device; and control means for making said display device display the calling party information detected by said calling party detection means and storing in said memory device response information indicating whether or not a person using the telephone apparatus has responded to the call from said third party.

15. A telephone apparatus including a parent set connected to a telephone line and a child set capable of wireless communication with said parent set, wherein said parent set comprises:

a transmitter circuit for sending a speech signal onto said telephone line, a receiver circuit for receiving a speech signal from said telephone line, alert signal detecting means for detecting an alert signal sent from a telephone exchange in response to a call from a third party during a telephone conversation through said telephone apparatus, calling party information detecting means for detecting calling party information incoming from said telephone exchange via said telephone line after said alert signal, muting control means for muting said transmitter circuit upon receipt of the calling party information sent by said telephone exchange, calling party information sending means for sending out said calling party information stored in said memory device, a memory device, and control means for receiving from said child set response information indicating whether or not said child set has responded to the call from said third party, and storing the received information in said memory device; and wherein said child set comprises:

a microphone, a speaker, transmission and reception amplifier means for transmitting to and receiving from said parent set speech signals, and calling party information receiving means for receiving and detecting calling party information sent from said parent set.

16. A telephone apparatus including a parent set connected to a telephone line and a child set capable of wireless communication with said parent set, wherein said parent set comprises:
- a transmitter circuit for sending a speech signal onto said telephone line,
- a receiver circuit for receiving a speech signal from said telephone line,
- alert signal detecting means for detecting an alert signal sent from a telephone exchange in response to a call from a third party during a telephone conversation through said telephone apparatus,
- calling party information detecting means for detecting calling party information incoming from said telephone exchange via said telephone line after said alert signal,
- muting control means for muting said transmitter circuit upon receipt of the calling party information sent by said telephone exchange, and
- calling party information sending means for sending out the detected calling party information; and wherein said child set includes:
- a microphone,
- a speaker,
- transmission and reception amplifier means for transmitting to and receiving from said parent set speech signals, and
- calling party information receiving means for receiving means for receiving and detecting the calling party information sent from said parent set.

17. A telephone apparatus of above claim 16, wherein said parent set further comprises:
- a memory,
- parent set control means for storing in said memory said calling party information detected by said calling party information detecting means, and
- calling party information sending means for sending out to said child set said calling party information stored in said memory.

18. A telephone apparatus according to claim 16, wherein said child set further comprises a display device and child set control means for displaying the calling party information on said display device.

19. A telephone apparatus according to claim 16, wherein said parent set further comprises acknowledge signal sending means for sending out automatically an acknowledge signal onto said telephone line after detection of said alert signal, said acknowledge signal serving as a message for indicating the detection of said alert signal to said telephone exchange.

20. A telephone apparatus including a parent set connected to a telephone line and a child set capable of wireless communication with said parent set, wherein said parent set comprises:
- a transmitter circuit for sending a speech signal onto said telephone line,
- a receiver circuit for receiving a speech signal from said telephone line,
- alert signal detecting means for detecting an alert signal sent from a telephone exchange in response to issuance of a call from a third party during a telephone conversation through said telephone apparatus,
- calling party information detecting means for detecting calling party information incoming from said telephone exchange via said telephone line after the alert signal,
- muting control means for muting said transmitter circuit upon receipt of said calling party information sent by said telephone exchange, and
- calling party information sending means for sending out to said child set said calling party information detected by said detecting means; and wherein said child set comprises:
- a microphone,
- a speaker
- transmission and reception amplifier means for transmitting to and receiving from said parent set speech signals, and
- calling party information receiving means for muting at least a portion of said transmission and reception amplifier means in order to receive said calling party information sent from said calling party information sending means, to detect said calling party information and to clear the muting of said at least a portion of said transmission and reception amplifier means after the calling party information has ended.

\* \* \* \* \*